United States Patent [19]
Lupoli

[11] Patent Number: 5,154,079
[45] Date of Patent: Oct. 13, 1992

[54] REMOTE INDICATOR ATTACHMENT KIT

[76] Inventor: Peter A. Lupoli, 37 Nod Brook Rd., Wallingford, Conn. 06492

[21] Appl. No.: 767,495

[22] Filed: Sep. 30, 1991

[51] Int. Cl.$^5$ .................. G01F 23/38; H01H 36/02
[52] U.S. Cl. .................. 73/308; 200/84 C; 340/624
[58] Field of Search .................. 73/308; 200/84 C; 340/623–625

[56] References Cited

U.S. PATENT DOCUMENTS

| | | | |
|---|---|---|---|
| 1,834,934 | 12/1931 | Brach | 200/84 C |
| 3,114,478 | 12/1963 | Hilkemeier et al. | 200/84 C |
| 3,389,603 | 6/1968 | Jacobs, III | 73/308 |
| 4,290,059 | 9/1981 | Noyes et al. | 340/624 |
| 4,736,077 | 4/1988 | Valente | 200/84 C |

Primary Examiner—Allan N. Shoap
Assistant Examiner—W. Morris Worth
Attorney, Agent, or Firm—H. Gibner Lehmann; K. Gibner Lehmann

[57] ABSTRACT

A remote indicator attachment kit for use with the mechanical level gauge of an oil tank located in the basement area of a dwelling, to indicate at a remote point the drop in oil level, comprises a magnet attachable to the movable member of the existing mechanical gauge, and a reed switch and mounting that is attachable to the see-through housing of the mechanical gauge, to be influenced by the magnet on the movable member. Circuitry connected to the reed switch and to the remote indicator is energized to provide an indication at the remote point.

5 Claims, 1 Drawing Sheet

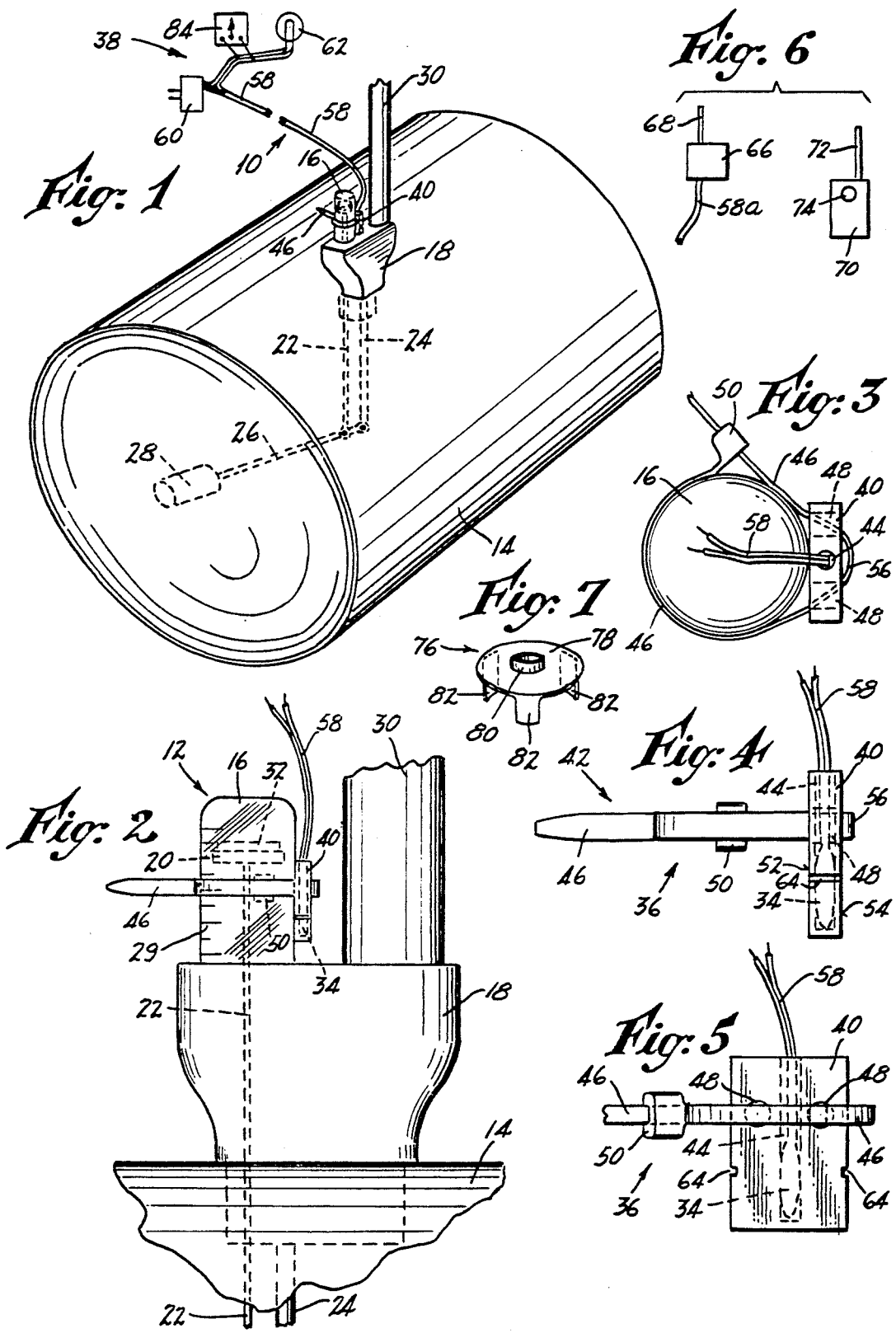

REMOTE INDICATOR ATTACHMENT KIT

STATEMENT AS TO RIGHTS TO INVENTIONS MADE UNDER FEDERALLY-SPONSORED RESEARCH AND DEVELOPMENT.

Research and development of the present invention and application have not been Federally-sponsored, and no rights are given under any Federal program.

BACKGROUND OF THE INVENTION

1. Field of the Invention

This invention relates to kits for use with oil level indicators of fuel tanks, to provide at a remote point, indications of fuel level in the tank.

2. Description of the Related Art Including Information Disclosed Under 37 CFR §§ 1.97-1.99

Fuel tanks located in the basement areas of dwellings are usually provided with a simple mechanical level indicator that is visible at the top of the tank. It is often inconvenient or undesirable for the dweller of the building to descend to the basement area to continually check the oil level to insure against the tank running out of oil.

SUMMARY OF THE INVENTION

The present invention overcomes this drawback of prior indicators which are located at the top of the tank, and one object of the invention is to provide a novel and improved especially simple indicator attachment kit for use with existing mechanical level indicators, to provide an indication of the oil level at a convenient point remote from the tank, for instance in an upstairs room of the dwelling or building.

Another object of the invention is to provide an improved indicator attachment kit as above set forth, which has few and simple parts, and is economical to produce.

Still another object of the invention is to provide an improved indicator attachment kit in accordance with the foregoing, which is reliable in operation and not likely to malfunction even over an extended period of time and usage.

A still further object of the invention is to provide an improved indicator attachment kit as above characterized, which is especially easy to install, even by a relatively unskilled person.

A feature of the invention is the provision of an improved electrically-operated kit as outlined above, which involves only low voltages and light wiring and is thereby safe to install and operate. The installation and use does not involve building codes, electrical regulations, and the like.

Still another feature of the invention is the provision of an improved remote indicator of the kind described, which can be easily and quickly serviced should this become necessary.

Other features and advantages will hereinafter appear.

BRIEF DESCRIPTION OF THE DRAWINGS

The accompanying drawings show several embodiments of the invention.

FIG. 1 is a perspective view of a conventional domestic fuel oil tank as adapted for installation in the basement of a dwelling, together with an attached remote indicator kit as provided by the present invention.

FIG. 2 is a side elevational view of the existing conventional mechanical level indicator as commercially available, mounted on the upper wall of the oil tank with a portion of the remote "hard-wire" type indicator kit of the present invention attached to the level indicator.

FIG. 3 is a top plan view of the indicator parts of FIG. 2.

FIG. 4 is a side elevational view of the remote indicator parts depicted in FIG. 3.

FIG. 5 is a frontal elevational view of the remote indicator parts shown in FIGS. 3 and 4.

FIG. 6 is a diagrammatic representation of portions of a "wireless" type of remote indicator according to the invention, and FIG. 7 is a perspective view of an attachment member for mounting a magnet on the movable member of the existing mechanical level indicator.

DESCRIPTION OF THE PREFERRED EMBODIMENT

The remote electrical indicator kit of the invention is indicated generally by the numeral 10 in FIG. 1. It is cooperable with a conventional mechanical type oil level indicator designated generally by the numeral 12 in FIG. 2. The mechanical indicator 12 is commercially available for use with indoor fuel oil tanks such as the tank 14, FIGS. 1 and 2.

The mechanical level indicator 12 has a see-through housing 16 usually constituted of clear plastic in the form of a small inverted jar having screw-threads around its mouth (not shown) for mounting it in a double-socketed fitting 18 that is threaded into the tank 14.

The oil level indicator 12 has a vertically movable indicator member 20 that travels in the housing 16 and is carried at the top of a vertically movable shaft 22 which bears in the fitting 18. The shaft 22 parallels a fixed rod 24 carried by the fitting 18, and at their bottom ends the shaft 22 and rod 24 are pin-connected to a cross arm 26 to provide for pivotal upward and downward arcuate movement of the shaft. At the free end of the arm 26 a float 28 is mounted. Thus the changing oil level in the tank 14 moves the float up or down, with corresponding up or down movement of the indicator member 20. The housing 16 has graduations 29 to which the member 20 can be referred, for giving a reading as to the fullness of the tank 14.

The housing 16 is threaded in one socket of the fitting 18, which mounts in another socket thereof a breather pipe 30, as is usual.

In accordance with the present invention an inexpensive, novel, remote, easily and quickly installed electrical indicator attachment kit is provided for cooperation with the mechanical indicator 12, by which the readings of the indicator 12 can be relayed to a remote point in the dwelling, as for example in an upstairs room, for the convenience of the householder. In FIG. 1 this kit is generally indicated by the numeral 10. It comprises a permanent magnet 32 which in its preferred form has the shape of a thin flat disc with north and south poles at its opposite flat sides. The magnet disc 32 can be cemented on top of the existing indicator member 20 by a suitable adhesive which is impervious to the fumes of the oil from the tank 14. Its weight is negligible compared with the force and leverage of the mechanical system 12 which is commercial product along with the tank 14.

The electrical indicator kit 10 further comprises a reed switch 34, FIGS. 2, 4 and 5, and clamp means 36 for adjustably mounting the reed switch on the see-through housing 16 of the mechanical level gauge 12 whereby the switch can be fixed at a desired level for actuation by the magnet 32. Such adjustable positioning makes it possible to effect actuation or energization of the electrical signal (see 62 in FIG. 1) of the kit for any one of a number of predetermined fractional quantities of a full tank of oil, as will be later more fully explained.

In FIG. 1 the numeral 38 generally indicates a simple form of the remote portion of the electrical kit of the invention.

The clamping means 36 comprises a block 40 of non-magnetic material such as plastic, having attached to it a clamp 42 which extends around and embraces the see-through housing 16. The 40 is shown as having a socket 44 in which the reed switch 34 is received. The clamp 42 comprises, in the present embodiment, a flexible or resilient strap 46 which is adapted to pass through holes or openings 48 in the block in the manner indicated in FIG. 3, said openings constituting a means for receiving and confining the tie strap 46 in operative position on the block.

It will be seen that the vertical axis of the socket 44 makes substantially a right angle with respect to the plane containing the axes of the holes 48.

The tie strap 46 has at one end a resilient pass-through or socket portion 50 which receives the strap 46 along its length and is adapted to grip along various points on such length to hold the same tightly. Tie straps such as 46 are well known commercially and per se form no part of the present invention.

The strap 46 is seen to extend from the opposite flat faces 52 and 54 of the block 40, with a bowed portion 56 of the strap projecting from the face 54 and the large loop portion of the strap extending from the face 52. Leads 58 from the reed switch 34 can exit at the top of the block, as in the figures.

The block 40 has index marks in the form of grooves or cuts 64 in opposite edges. The cuts 64 can be referred to the indicia 29 on the see-through housing, when placing the reed switch mounting and clamping device on the housing, as a guide to adjustment to the position desired for indicating the extent to which the tank has emptied.

The leads 58 go to a plug-in transformer unit 60 which is adapted to plug into an electrical wall outlet (not shown). The unit 60 provides current for an indicator lamp 62, which becomes lighted whenever the reed switch closes.

In place of the hard-wired remote unit 38 of the kit as described above, a wireless unit can be employed, as shown in FIG. 6. This wireless unit comprises a transmitter 66 having an antenna 68 and leads 58a for connection to the reed switch 34, and also a receiver unit 70 having a receiving antenna 72 and an indicator lamp 74. The transmitter can be located in the basement of the dwelling at a convenient spot, and the receiver can be disposed in an upstairs room, such as the kitchen for example.

With the arrangement illustrated, the kit 10 can be easily and quickly applied to existing mechanical indicators of the kind shown.

Referring to FIGS. 3–5, the strap 46 is preferably preassembled to the block 40 and the reed switch 34 is affixed in the socket 44 of the block all at the manufacturing site.

To install the kit, the installer first unscrews the housing 16 from the fitting 18 and cements the magnet 32 in place on the indicator member 20. The housing 16 is then replaced. The installer next applies the clamping means comprising the block 40 and strap 56 to the housing 16, locating the index mark 64 to align with, for example, the ¼ fuel graduation on the see-through housing 16, and then pulls the strap 56 tight so as to grip the housing securely. The resilience of the strap 56 and its socket 50 make for a firm mounting. The leads 58 are strung along convenient beams and studs, and the transformer unit 60 can be located in the basement or else in an upstairs room. The indicator lamp 62 can be at a convenient place in the kitchen of the dwelling, for example. The associated leads can be of small gauge wire, since but little current is involved.

It will now be understood that the kit of the present invention is especially simple and economical to manufacture. Besides its low cost, however, it is reliable in operation and not likely to malfunction. It can be easily and quickly installed by a person handy with tools, following simple directions supplied with the unit.

Instead of cementing the magnet 32 to the movable member 20, a simple attachment means 76 can be provided as shown in FIG. 7. This means is in the form of a plate or disc 78 preferably of steel or other magnetic material, having a hub 80 that is receivable in a central hole (not shown) of the magnet disc 32 when the latter is placed on top of the disk 78. The disc 78 has three depending fingers 82 that can embrace and be folded under the movable member 20. The magnetic attraction of the magnet 32 for the disc 78 keeps the magnet in place. The fingers are thin and easily folded by hand pressure.

A failure-proof means is provided to nullify the effect of a burn-out of the lamp 62, in the form of an instrument movement 84 which parallels the lamp leads. The movement 84 having a pointer which will register even if the lamp is burned out.

Variations and modifications are possible without departing from the spirit of the invention.

Each and every one of the appended claims defines an aspect of the invention which is separate and distinct from all others and accordingly it is intended that each claim be treated in this manner when examined in the light of the prior art devices in any determination of novelty or validity.

What is claimed is:

1. A remote indicator attachment kit for use with a mechanical level gauge of an oil tank located in the basement area of a dwelling to indicate, to the dwelling's occupant who is located at a remote point from said tank, that the oil level in the tank has dropped below a predetermined value, said level gauge having a see-through housing an a vertically movable indicator member in said housing, comprising in combination:

a) a permanent magnet adapted to be fixed onto the movable indicator member of said mechanical level gauge to move therewith, b) a reed switch actuatable by said permanent magnet when brought near the magnet, c) clamp means for adjustably mounting said reed switch on the see-through housing of the mechanical level gauge for adjustment to different levels thereon, d) an electrically actuatable indicator for installation at said remote point, e) energizable electric means cooperable with said reed switch and said electrically actuatable indicator, to activate the latter when the reed switch is actuated by said permanent magnet, and f) an attachment member having means for gripping said indicator member and having positioning means engageable with the magnet.

2. An indicator attachment kit as set forth in claim 1, wherein:

a) said attachment member comprises a plate on which the magnet can rest, b) said means for gripping the indicator member comprising fingers extending from said plate.

3. An indicator attachment kit as set forth in claim 2, wherein:

a) said positioning means comprises a hub on said plate, adapted to extend into a recess in said magnet.

4. An indicator attachment kit as set forth in claim 2, wherein:

a) said plate is constituted of magnetic material.

5. A remote indicator attachment kit for use with a mechanical level gauge of an oil tank located in the basement area of a dwelling to indicate, to the dwelling's occupant who is located at a remote point from said tank, that the oil level in the tank has dropped below a predetermined value, said level gauge having a see-through housing and a vertically movable indicator member in said housing, comprising in combination:

a) a permanent magnet adapted to be fixed onto the movable indicator member of said mechanical level gauge to move therewith, b) a reed switch actuatable by said permanent magnet when brought near the magnet, c) clamp means for adjustably mounting said reed switch on the see-through housing of the mechanical level gauge for adjustment to different levels thereon, d) an electrically actuatable indicator for installation at said remote point, and e) energizable electric means cooperable with said reed switch and said electrically actuatable indicator, to activate the latter when the reed switch is actuated by said permanent magnet, f) said electrically actuatable indicator including an electric light and a meter movement connected in parallel with the light, said movement having a pointer to constitute a back-up signal.

* * * * *